(12) United States Patent
Liao et al.

(10) Patent No.: US 11,649,358 B2
(45) Date of Patent: May 16, 2023

(54) BORATE SALTS, POLYMERS AND COMPOSITES

(71) Applicant: UCHICAGO ARGONNE, LLC, Chicago, IL (US)

(72) Inventors: Chen Liao, Westmont, IL (US); Trevor L. Dzwiniel, Carol Stream, IL (US); Kewel Liu, Aurora, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 781 days.

(21) Appl. No.: 16/567,647

(22) Filed: Sep. 11, 2019

(65) Prior Publication Data

US 2021/0071000 A1    Mar. 11, 2021

(51) Int. Cl.
| | |
|---|---|
| *C08L 85/04* | (2006.01) |
| *H01M 10/0525* | (2010.01) |
| *H01M 10/0565* | (2010.01) |
| *C08K 5/37* | (2006.01) |
| *C07F 5/04* | (2006.01) |
| *H01M 4/62* | (2006.01) |
| *C08G 79/08* | (2006.01) |

(52) U.S. Cl.
CPC ............... *C08L 85/04* (2013.01); *C07F 5/04* (2013.01); *C08G 79/08* (2013.01); *C08K 5/37* (2013.01); *H01M 4/622* (2013.01); *H01M 10/0525* (2013.01); *H01M 10/0565* (2013.01); *H01M 2300/0091* (2013.01)

(58) Field of Classification Search
CPC ...................................................... C08L 85/04
See application file for complete search history.

(56) References Cited

U.S. PATENT DOCUMENTS

| | | | |
|---|---|---|---|
| 7,504,473 B2 | 3/2009 | Angell et al. | |
| 9,221,844 B2 * | 12/2015 | Mahanthappa | ... H01M 10/0565 |
| 9,260,456 B2 | 2/2016 | Wietelmann et al. | |
| 9,300,009 B2 * | 3/2016 | Sun | ................. H01M 10/0567 |
| 9,382,274 B2 | 7/2016 | Esswein et al. | |
| 2017/0331153 A1 | 11/2017 | Sun et al. | |

FOREIGN PATENT DOCUMENTS

| | | | | |
|---|---|---|---|---|
| CN | 106935904 | * | 7/2017 | ............ H01M 4/485 |
| CN | 106935904 B | | 7/2019 | |
| WO | 02068433 A1 | | 2/2002 | |
| WO | 2018094101 | * | 5/2018 | ............ H01M 4/485 |

OTHER PUBLICATIONS

Deng, Journal of Power Sources (2017), 360, 98-105 Network type sp3 boron-based single-ion conducting polymer electrolytes for lithium ion batteries.*
Zhong1, Lithium Borate Containing Bifunctional Binder To Address Both Ion Transporting and Polysulfide Trapping for High-Performance Li—S Batteries, ACS Appl. Mater. Interfaces 2019, 11, 28968-28977.*
Zhang, Chem. Soc. Rev., 2017, 46, 797-815.*
Sun, X-G., et al., Synthesis and Characterization of Network Single Ion Conductors Based on Comb-Branched Polyepoxide Ethers and Lithium Bix(allylmalonato)borate, Macromolecules 39, 362-372 (2006).
Sun, X-G. et al., New Promising Lithium Malonatoborate Salts For High Voltage Lithium Ion Batteries, Journal of Materials Chemistry A 5, 1233-1241 (2017).
Weber, R.L. et al., Thiol-Ene Synthesis and Characterization of Lithium Bis(malonato)borate Single-Ion Conducting Gel Polymer Electrolytes, Soft Matter 13, 7633-7643 (2017).
Xu, W. et al., Structures of Orthoborate Anions and Physical Properties of Their Lithium Salt Nonaqueous Solutions, Journal of the Electrochemical Society 150 (1), E74-E80 (2003).

* cited by examiner

*Primary Examiner* — Nizal S Chandrakumar
(74) *Attorney, Agent, or Firm* — Olson & Cepuritis, Ltd.

(57) ABSTRACT

Described herein are borate salts useful as additives, binders, and electrolyte salts for solid state lithium ion batteries. In particular, the borate salts of Formula (I), Formula (II) and Formula (III) as described herein:

$$\left[ \begin{array}{c} Z^1 \\ Z^2 \end{array} \begin{array}{c} O \\ O \end{array} \begin{array}{c} O \\ B \\ O \end{array} \begin{array}{c} O \\ O \end{array} \begin{array}{c} Z^1 \\ Z^2 \end{array} \right]_n M^{n+} \quad (I)$$

$$\left[ \begin{array}{c} Z^1 \\ Z^2 \end{array} \begin{array}{c} O \\ O \end{array} \begin{array}{c} O \\ B \\ F \end{array} \right]_n M^{n+} \quad (II)$$

$$\left[ Z^1-X-O \begin{array}{c} O \\ B \\ O \end{array} O-U-Z^3 \atop Z^2-Y-O \quad O-V-Z^4 \right]_n M^{n+} \quad (III)$$

can be polymerized, or can be bound to an existing polymer, to provide polymeric binders for ceramic solid state electrolytes that are themselves capable of ion transport independent of the ceramic.

18 Claims, 3 Drawing Sheets

BORATE SALTS, POLYMERS AND COMPOSITES

STATEMENT OF GOVERNMENT INTEREST

The United States Government has rights in this invention pursuant to Contract No. DE-AC02-06CH11357 between the United States Government and UChicago Argonne, LLC representing Argonne National Laboratory.

FIELD OF THE INVENTION

This invention relates to borate salts suitable for use in electrochemical cells and batteries. More particularly, this invention relates to borate salts such as bis(malonato)borate and difluoro(malonato)borate salts, which are polymerizable or attachable to polymers, as well as the use of such borate-containing polymers as binders for solid state electrode materials.

BACKGROUND

Current composite electrolytes for solid state lithium batteries typically comprise an ion-conduct membrane (often referred to as a separator) comprising a lithium conductive ceramic material that can transport lithium ions back and forth across the membrane during charging and discharging of the battery. In some cases the ceramic separator is a sintered ceramic sheet, often in the form of a disc. In other cases, the separator can be a composite of conductive ceramic particle dispersed in a binder (typically a polymer such as poly(ethylene oxide), also known as PEO). The separators can be tailored to transport only one particular ion (single-ion conduction). State of the art free-standing ceramic separators (i.e., sintered ceramics), such as sintered lithium-lanthanum-zirconium oxide (LLZO), such as $Li_7La_3Zr_2O_{12}$, suffer from a number of shortcomings. For example, the sintered separators are fragile are easily cracked or broken, have uneven stress, and uneven grain boundaries. In addition, the free standing separators typically have a high contact resistance. The manufacture of free-standing ceramic separators also requires high sintering temperatures.

The use of polymer bound ceramic composites (e.g., LLZO particles in a PEO binding matrix, referred to as LLZO-PEO) can ameliorate the fragility issue of the free-standing sintered ceramics, since the polymer composites can be flexible materials. These polymer-bound ceramic separators, such as LLZO-PEO (or LLZO-polymer) separators, suffer from much lower ionic conductivity compared to the sintered separator with the same ceramic component, and often have low electrochemical stability under conditions of repeated charging and discharging encountered in rechargeable battery applications.

Because of the shortcomings of current solid state electrolyte materials, there is an ongoing need for new separator materials that can address some of the problems associated with the current ceramic separator materials used in solid state battery systems. The borate salts, polymers, and borate polymer/ceramic composites described herein address this need.

SUMMARY

Described herein are borate salts useful as additives, binders, and electrolyte salts for solid state lithium ion batteries. In particular, the borate salts of Formula (I), Formula (II) and Formula (III) as described herein:

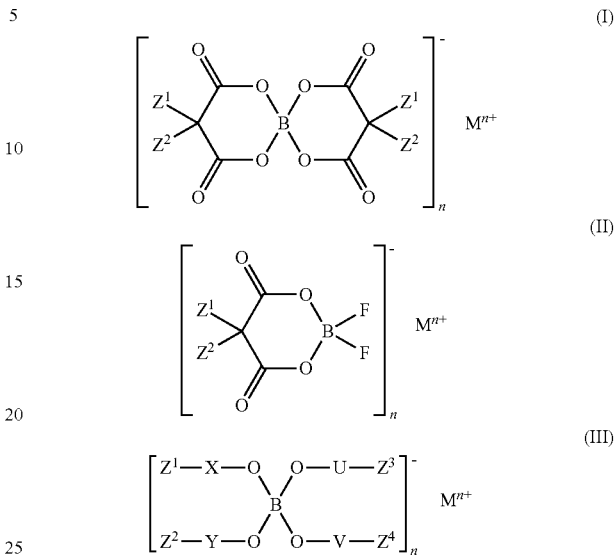

can be polymerized, or can be bound to an existing polymer, to provide polymeric binders for ceramic solid state electrolytes that are themselves capable of ion transport independent of the ceramic. Such materials are described herein as single-ion-binders (SI binders). In Formulas (I), (II), and (III), $M^+$ is a metal ion, and the $A^1$, $Z^2$, $Z^3$, $Z^1$, $Z^5$, and $Z^6$ groups are substituents that are covalently bound to the 2-carbon of inalonic acid in Formulas (I) and (II), or are bound to X, Y, U and V in Formula (III). The X, Y, U and V groups are hydrocarbyl linking groups (es., aliphatic, aromatic or cyclic hydrocarbyl groups) that bind $Z^3$, $Z^4$, $Z^5$, and $Z^6$ to the borate oxygen atoms. Optionally, the linking groups can comprise ether, sulfide, carbonyl, amine, alcohol, halide, ester, amide, anhydride, nitro, imine, nitrile, and/or epoxide groups. At least one of $Z^1$, $Z^2$, $Z^3$, $Z^4$, $Z^5$, and $Z^6$ includes a reactive group, such as an alkenyl group, an alkynyl group, a thiol group, or halogen group. The alkenyl groups comprise an organic compound containing a reactive carbon-carbon double bond (e.g., a vinyl group ($CH_2$=CH—) or allyl group), while alkynyl groups comprise a carbon-carbon triple bond (e.g., a propargyl group or other acetylenic group). For instance, the alkenyl group can be a styrene, a, vinyl halide, a methacrylate acid, a methyl methacrylate, an acrylic acid, an ethyl acrylate, as well as other derivatives of acrylic acid and methacrylic acid, such as their nitriles (e.g., an acrylonitrile group), amides (an acrylamide group), and esters (e.g., an acrylate ester group), and the like, which can be polymerized (e.g., alone, or in combination with a comonomer, and/or a crosslinking monomer) or attached to a preformed polymer to form a single-ion-conductive polymer. The resulting borate decorated polymer is complexed with a particulate ceramic material to form a solid-state electrolyte material.

In some embodiments, one, two, three, four, five or all six of $Z^1$, $Z^2$, $Z^3$, $Z^4$, $Z^5$, and $Z^6$ can include the reactive, polymerizable group. For compounds of Formula (I), it is preferred that each $Z^1$ or each $Z^2$ comprises the reactive group, resulting on a borate salt having two reactive groups. Generally, for ease of synthesis, both $Z^1$ groups in Formula (I) will be the same as each other, and both $Z^2$ groups will be the same as each other, but $Z^1$ and $Z^2$ will be different. This creates a bifunctional monomer, which is capable of either self-polymerization, polymerization with a bifunctional comonomer or a multifunctional crosslinking monomer, or attachment to an existing polymer having complementary reactive groups that can bind with but $Z^1$ or $Z^2$, or a combination thereof.

For some preferred embodiments of Formula (II) both of $Z^1$ and $Z^2$ will include a reactive polymerizable group so that the salt will be a bifunctional monomer as in the case of the salts of Formula (I). For example, either $Z^1$ and $Z^2$ in Formula (II) can include an unsaturated group such as allyl or acetylene (e.g., propargyl) or any other functional group (e.g., a thiol-substituted group, or a halogen-substituted group) that is capable of polymerizing or reacting with a group on another material to form a bond (e.g., a covalent bond, a coordination bond, a hydrogen bond, and the like) that can result in a stable three-dimensional (3-D) network.

Similarly, in some preferred embodiments of Formula (III), at least two of $Z^3$, $Z^4$, $Z^5$, and $Z^6$ will include an unsaturated group such as allyl or acetylene (e.g., propargyl) or any other functional group (e.g., a thiol-substituted group, or a halogen-substituted group) that is capable of polymerizing or reacting with a group on another material to form a bond (e.g., a covalent bond, a coordination bond, a hydrogen bond, and the like) that can result in a stable three-dimensional (3-D) network.

Non-limiting examples of reactions that can form a 3-D network with the borate salts include, e.g., Click reactions, ene addition reactions, radical polymerizations or addition reactions, and the like.

The reason to include unsaturated groups, thiols, halogen and other such reactive groups is to have a functionality that can anchor the compounds of Formula (I), (II) or (III) onto a crosslinker, to another comonomer, or to an existing polymer to form a polymeric structure with attached borate groups. The composition of the final polymer can either be synthesized from a mixture of one of the borates of Formula (I) to Formula (III) together with a comonomer (e.g., crosslinker), or from mixture of the compound of Formula (I), (II), or (III) itself, or by attaching the borate of Formula (I) to (III) as pendant groups to a previous prepared well-functionalized polymer.

When polymers comprising a bound bis(malonato)borate derived from Formula (I), a bound difluoro (malonato)borate salt derived from Formula (II), or another attachable borate salt, such as a salt derived from Formula (III), is used as a binder for ion-conductive ceramic particles, the resulting polymer-ceramic composite is mechanically flexible like PEO-based composites, but has significantly higher ionic conductivity (e.g., lithium ion conductivity) and surprisingly higher electrochemical stability under lithium battery operating conditions.

In addition, the reactive alkenyl, alkynyl, halogen-substituted, and thiol-substituted groups, or any polymerizable functional groups (styrene, acrylate and many more) of $Z^1$, $Z^2$, $Z^3$, $Z^4$, $Z^5$, and $Z^6$ of the salts of Formulas (I), (II) and (III) can be polymerized alone or with one or more other commoner, or attached to a polymer, by reactions such a radical polymerization with alkenes or alkynes, end reactions with thiols, nucleophilic substitutions with nucleophilic compounds (e.g., amines), or by Click reactions or other reactions forming covalent bonds, in order to form ions with larger side chains. For example, an allyl group can be reacted with a thiol-substituted hydrocarbon via thio-ene reaction to form a sulfur carbon bond attaching the hydrocarbon or other molecule to the salt to form a larger ion. Similarly, two thiol groups can oxidatively couple to form a disulfide bond, or a halogen substituted group can react with a nucleophilic group, such as a thiol, to form a bond by displacement of the halogen.

Non-limiting examples of certain embodiments of the borate salts and polymers described are provided below to illustrate certain aspects and features of the inventions described herein.

Embodiment 1 is borate salt of Formula (I), Formula (II) or Formula (III):

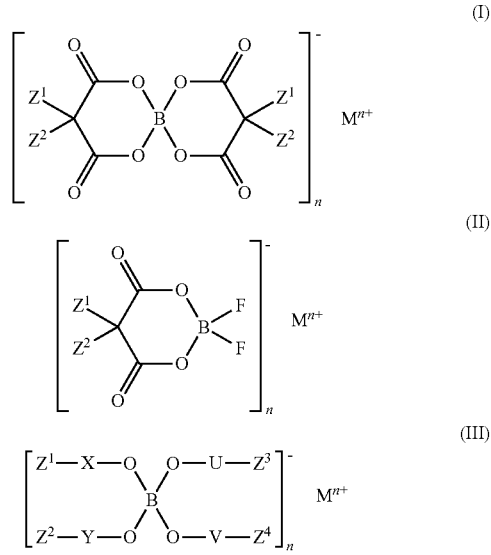

wherein:

$Z^1$, $Z^2$, $Z^3$, $Z^4$, $Z^5$, and $Z^6$ are selected from the group consisting of an alkyl group, a substituted alkyl group, $-R^1-O-(R^2-O)_m-R^3$, $-O-(R^2-O)_m-R^3$, $-R^1-O-(R^2-O)_m-R^4$, $-O-(R^2-O)_m-R^4$, an alkenyl group, an alkynyl group, a haloalkyl group, alkylenethiol group, and a halogen;

$R^1$ is an alkylene group;

each $R^2$ independently is an alkylene group;

$R^3$ is H or alkyl;

$R^4$ is selected from the group consisting of an alkenyl group, an alkynyl group, a haloalkyl group, and an alkylenethiol group;

X, Y, U and V are hydrocarbyl groups that optionally can be substituted by one or more moieties selected from the group consisting of an ether, a sulfide, a carbonyl, an amine, an alcohol, a halide, an ester, an amide, an anhydride, a nitro, an imine, a nitrile, and an epoxide;

n is an integer from 1 to 6 (preferably 1, 2, or 3, more preferably 1 or 2);

m is a number from 1 to about 1000;

$M^{n+}$ is a cation;

at least one of $Z^1$, $Z^2$, $Z^3$, $Z^4$, $Z^5$, and $Z^6$ is selected from the group consisting of $-R^1-O-(R^2-O)_x-R^4$, and $-O-(R^2-O)_m-R^4$, an alkenyl group, an alkynyl group, a haloalkyl group, or an alkylenethiol group; and each substituted alkyl group comprises at least one substituent selected from the group consisting of a halogen, an amino group, a hydroxyl group, an alkoxy group, a cyano group; a thiol group, a alkylthio group (e.g., $-SCH_3$), a sulfonyl group, a sulfonylamido group, a carboxylic acid group, a carboxylic ester group, a ketone group, a carboxylic amide group, an aryl group, a heteroaryl group, and a nonaromatic heterocyclic group.

Embodiment 2 is the borate salt of embodiment 1, wherein in Formula (I) $Z^1$ is fluoro, and $Z^2$ is selected from the group consisting of an alkenyl group, an alkynyl group, a haloalkyl group, and an alkylenethiol group.

Embodiment 3 is the borate salt of any one of embodiments 1 and 2, wherein in Formula (II) $Z^1$ and $Z^2$ independently are selected from the group consisting of an alkenyl group, an alkynyl group, a haloalkyl group, and an alkylenethiol group.

Embodiment 4 is the borate salt of any one of embodiments 1 to 3, wherein in Formula (I), both $Z^1$ groups are identical.

Embodiment 5 is the borate salt of any one of embodiments 1 to 4, wherein in Formula (I) both $Z^2$ groups are identical.

Embodiment 6 is the borate salt of any one of embodiments 1 to 5, wherein in Formula (1) $Z^2$ is selected from the group consisting of —$R^1$—O—($R^2$—O)$_m$—$R^4$ and —O—($R^2$—O)$_x$$R^4$.

Embodiment 7 is the borate salt of any one of embodiments 1 to 6, wherein in Formula (11) $Z^2$ is selected from the group consisting of allyl and propargyl.

Embodiment 8 is the borate salt of any one of embodiments 1 to 7, wherein n is 1 and $M^{n+}$ is a cation selected from the group consisting of a hydrogen cation, an alkali metal cation, and an ammonium cation.

Embodiment 9 is the borate salt of any one of embodiments 1 to 8, wherein n is 1 and $M^{n+}$ is $Li^+$.

Embodiment 10 is a polymer comprising at least one borate salt covalently bound to a polymeric substrate; wherein the polymeric substrate comprises at least one reactive substituent; and the polymer is formed by reacting at least one of $Z^1$, $Z^2$, $Z^3$, $Z^4$, $Z^5$, and $Z^6$ of a borate salt of embodiment 1 with the at least one reactive substituent on the polymeric substrate to form a covalent bond.

Embodiment 11 is the polymer of embodiment 10, wherein the at least one reactive substituent of the polymer substrate is reacted with at least one of $Z^1$, $Z^2$, $Z^3$, $Z^4$, $Z^5$, and $Z^6$ by a reaction selected from the group consisting of:

(a) an addition reaction, wherein the at least one reactive substituent of the polymeric substrate comprises a thiol group; and at least one of $Z^1$, $Z^2$, $Z^3$, $Z^4$, $Z^5$, and $Z^6$ comprises an alkene or alkyne;

(b) an addition reaction, wherein the at least one reactive substituent of the polymeric substrate comprises an alkenyl group or an alkynyl group; and at least one of $Z^1$, $Z^2$, $Z^3$, $Z^4$, $Z^5$, and $Z^6$ comprises an alkylenethiol group;

(c) a displacement reaction, wherein at least one of $Z^1$, $Z^2$, $Z^3$, and $Z^4$ comprises a haloalkyl group; the at least one reactive substituent on the polymeric substrate comprises a nucleophilic substituent; and the nucleophilic substituent displaces a halogen of the haloalkyl group to form a covalent bond;

(d) a displacement reaction, wherein the at least one reactive substituent on the polymeric substrate comprises a halogen group; and at least one of $Z^1$, $Z^2$, $Z^3$, $Z^4$, $Z_5$, and $Z^6$ comprises an alkylenethiol group;

(e) an oxidative coupling reaction, wherein at least one of $Z^1$, $Z^2$, $Z^3$, Z4, $Z^5$, and $Z^6$ comprises an alkylenethiol group; the at least one reactive substituent of the polymeric substrate comprises a thiol substituent; and the alkylenethiol group reacts the thiol substituent of the polymeric substrate to form a disulfide bond;

(f) an azide-alkyne Click reaction, wherein at least one of $Z^1$, $Z^2$, $Z^3$, $Z^4$, $Z^5$, and $Z^6$ comprises an alkynyl group, and the at least one reactive substituent on the polymeric substrate comprises and azide group, and the azide and alkyne undergo a 3+2 cycloaddition reaction to form a 1,2,3-triazole ring;

(g) a hydrosilylation reaction, wherein at least one of $Z^2$, $Z^3$, $Z^4$, $Z^5$, and $Z^6$ comprises an alkenyl or alkynyl group, and the at least one reactive substituent on the polymeric substrate comprises a silane group; and the silane group and the alkenyl or alkynyl group react to form a carbon silicon bond.

Embodiment 12 is the polymer of any one of embodiments 10 or 11, wherein the polymeric substrate is selected from the group consisting of a polyimide, a polyacrylate, a polyacrylonitrille, a polysulfone, a polystyrene, a polyphenylene sulfide, a poly(alkylene glycol), and a poly(perfluoroalkylene glycol).

Embodiment 13 is the polymer of any one of embodiments 10 to 12, wherein e)orate salt is a compound of Formula (I).

Embodiment 14 is a polymer formed by polymerizing a monomer composition comprising one or more of the borate salts of embodiments 1 to 9, wherein at least two of $Z^1$, $Z^2$, $Z^3$, $Z^4$, $Z^5$, and $Z^6$ are selected from the group consisting —$R^1$—O—($R^2$—O)$_x$—$R^4$, —O—($R^2$—O)$_x$—$R^4$, an alkenyl group, an alkynyl group, a haloalkyl group, and an alkylthio group; and $R^4$ is an alkenyl group, an alkynyl group, a haloalkyl group, or an alkylthio group.

Embodiment 15 is the polymer of embodiment 14, wherein the monomer composition further comprises one or more comonomers comprising at least one alkenyl, alkynyl group, haloalkyl group, or alkylthio group.

Embodiment 16 is the polymer of any one of embodiments 14 or 15, wherein the monomer composition further comprises a crosslinking monomer comprising three or more substituents selected from the group consisting of an alkenyl group, an alkynyl group, a thiol group, and a combination thereof.

Embodiment 17 is a ceramic composite comprising particles of one or more solid st ate lithium ion conducting ceramic bound together by a polymer of any one of claims 10 to 16.

Embodiment 18 is a ceramic composite comprising particles of one or more solid state lithium ion conducting ceramic bound together by a polymer of any one of claims 14 to 16, wherein the polymer is formed in situ by adding the monomer composition to the particles of the ceramic to form a precursor mixture, and then initiating polymerization of the monomer composition in the precursor mixture.

Embodiment 19 is the ceramic composite of embodiment 18, wherein the borate salt is a compound of Formula (1) in which $Z^1$ is F; $Z^2$ is allyl; the monomer composition includes a crosslinking monomer comprising three thiol groups; and polymerization is initiated by exposing the precursor mixture to ultraviolet light.

Embodiment 20 is the ceramic composite of embodiment 19, wherein the crosslinking monomer comprises trimethylolpropane tris(3-mercaptopropionate).

Embodiment 21 is the ceramic composite of any one of embodiments 19 or 20, wherein the ceramic particles comprise a lithium-lanthanum-zirconium oxide material.

Embodiment 22 is a process for preparing potassium bis(2-allyl-2-fluoromalonato)borate comprising the steps of:

(a) reacting diethyl 2-fluoromalonate with about one allyl bromide in the presence of a base (e.g., sodium ethoxide, sodium methoxide, and the like; optionally in a solvent such as an alcohol) to form diethyl 2-allyl-2-fluoromalonate;

(b) reacting the diethyl 2-allyl-2-fluoromalonate with an aqueous base (e.g., sodium hydroxide, potassium hydroxide, and the like in an aqueous solvent, such as a water/ethanol or water methanol mixture) to form a 2-allyl-2-fluoromalonate salt;

(c) acidifying the 2-allyl-2-fluoromalonate salt with a strong acid (e.g., hydrochloric acid or another mineral acid) to form 2-allyl-2-fluoromalonic acid; and (d) combining the 2-allyl-2-fluoromalonic acid with about 0.25 equivalents of potassium carbonate and about 0.5 equivalents of boric acid in an aprotic solvent capable of forming an azeotrope with water (e.g., diethylcarbonate); and refluxing the resulting mixture while azeotropically removing water formed from reaction of the 2-allyl-2-fluoromalonic acid with the potassium carbonate and the boric acid to thereby form potassium bis(2-allyl-2-fluoromalonato)borate.

DETAILED DESCRIPTION OF SELECTED EMBODIMENTS

Figure 1:
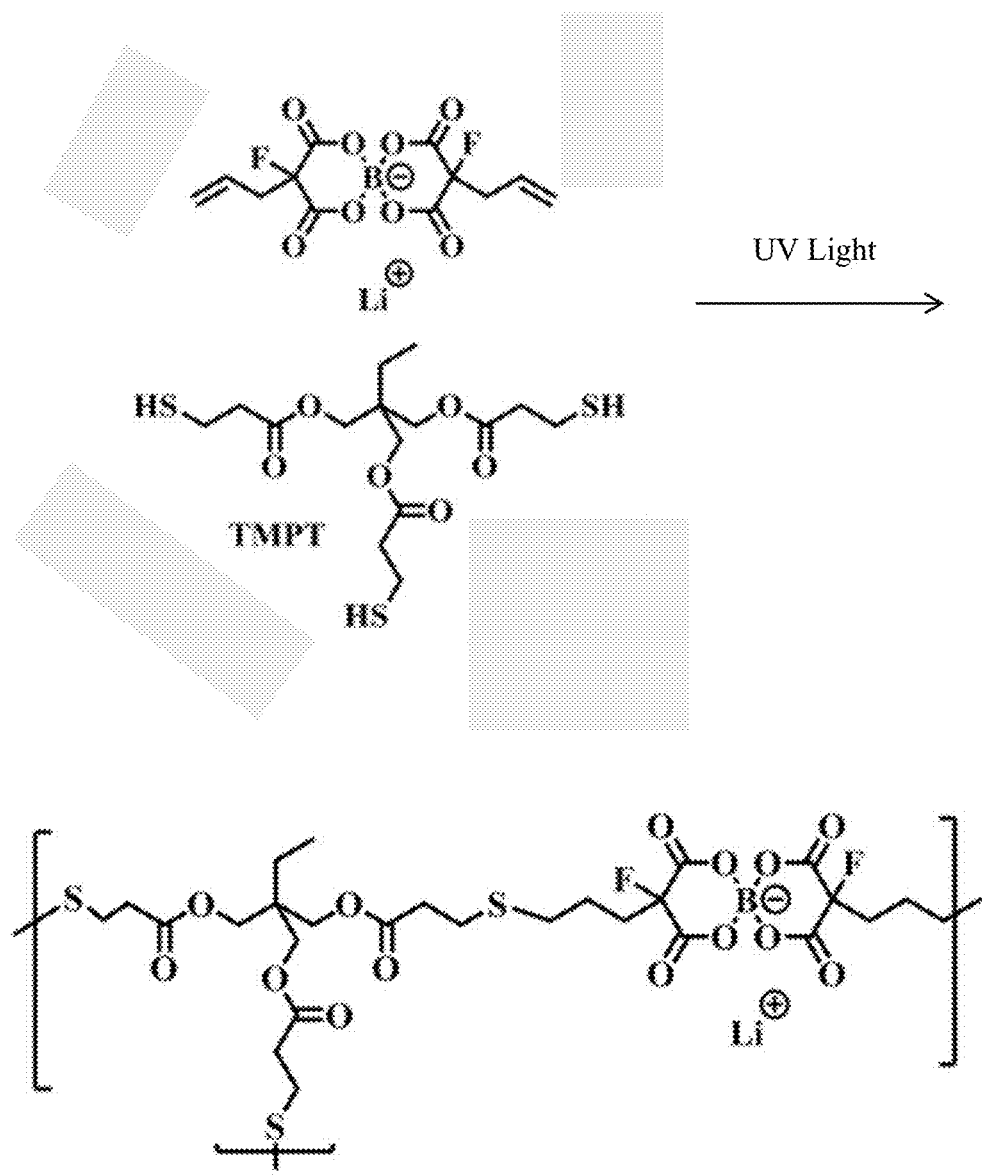
FIG. 1 schematically illustrates the preparation of a cross-linked polymer as described herein.

Borate salts are useful as additives, binders, and electrolyte salts for solid state lithium ion batteries. In particular, composites of a borate-substituted polymer and a particulate ceramic material are useful as solid state electrolytes for secondary battery systems. In one aspect, the composite is formed from a borate salt of Formula (I), Formula (II) or Formula

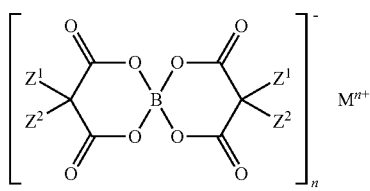

(I)

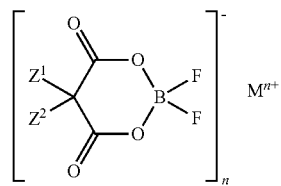

(II)

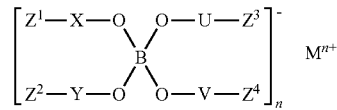

(III)

in which $Z^1$, $Z^2$, $Z^3$, $Z^4$, $Z^5$, and $Z^6$ are selected from the group consisting of an alkyl group, a substituted alkyl group, $-R^1-O-(R^2-O)_m-R^3$, $-O-(R^2-O)_m-R^3$, $-R^1-O-(R^2-O)_m-R^4$, $-O-(R^2-O)_m-R^4$, an alkenyl group, an alkynyl group, a haloalkyl group, alkylenethiol group, and a halogen.

$R^1$ is an alkylene group (e.g., $C_1$ to $C_6$ alkylene, such as $CH_2$, $CH_2CH_2$, and the like). Each $R^2$ independently is an alkylene group (e.g., $C_1$ to $C_6$ alkylene, such as $-CH_2-$, $-CH_2CH_2-$, and the like). $R^3$ is H or alkyl (e.g., $C_1$ to $C_6$ alkyl, such as methyl, ethyl, and the like). $R^4$ is selected from the group consisting of an alkenyl group (e.g., $C_2$ to $C_6$ alkenyl, such as vinyl, allyl, and the like), an alkynyl group (e.g., $C_2$ to $C_6$ alkynyl, such as ethynyl (acetylenyl), propargyl, and the like), a haloalkyl group (e.g., $C_1$ to $C_6$ alkyl substituted by one or more halogen, such as chloromethyl, 2-chloroethyl, 3-chloropropyl, 2,2,2-trichloroethyl, perfluoroethyl, and the like), and an alkylenethiol group (e.g., $C_1$ to $C_6$ alkyl substituted by SH, such as $-CH_2SH$, $-CH_2CH_2SH$, and the like). The value of m is a number from 1 to about 1000.

$M^{m+}$ is a cation, and n is an integral number that is reasonable as a charge state of a cation (e.g., 1, 2, 3, 4, 5, or 6). For example, $M^{n+}$ can be a hydrogen cation, an alkali metal cation, an alkaline earth metal cation, a main group metal cation or a transition metal cation.

X, Y, U and V are hydrocarbyl groups that optionally can be substituted by one or more moieties selected from the group consisting of an ether, a sulfide, a carbonyl, an amine, an alcohol, a halide, an ester, an amide, an anhydride, a nitro, an imine, a nitrile, an epoxide, and other functional, reactive or polymerizable substituents.

At least one of $Z^1$, $Z^2$, $Z^1$, $Z^4$, $Z^5$, and $Z^6$ is selected from the group consisting of $-R^1-O-(R^2-O)_x-R^4$, and $-O-(R^2-O)_x-R^4$, an alkenyl group, an alkynyl group, a haloalkyl group, or an alkylenethiol group. Each substituted alkyl group comprises at least one substituent selected from the group consisting of a halogen, an amino group, a hydroxyl group, an alkoxy group, a cyano group, a thiol group, a alkylthio group (e. $-SCH_3$), a sulfonyl group, a sulfonylamido group, a carboxylic acid group, a carboxylic ester group, a ketone group, a carboxylic amide group, an aryl group, a heteroaryl group, a nonaromatic heterocyclic group, and the like.

The alkenyl groups comprise an organic compound containing a reactive carbon-carbon double bond (e.g., a vinyl group ($CH_2=CH-$) or allyl group), while alkynyl groups comprise a carbon-carbon triple bond (e.g., a propargyl group or other acetylenic group). For instance, the alkenyl group can be a styrene, a, vinyl halide, a methacrylate acid, a methyl methacrylate, an acrylic acid, an ethyl acrylate, as well as other derivatives of acrylic acid and methacrylic acid, such as their nitriles (e.g., an acrylonitrile group), amides (an acrylamide group), and esters (e.g., an acrylate ester group), and the like, which can be polymerized (e.g., alone, or in combination with a comonomer, and/or a crosslinking monomer) or attached to a preformed polymer to form a single-ion-conductive polymer. The resulting borate decorated polymer is complexed with a particulate ceramic material to form a solid-state electrolyte material.

In some embodiments, the borate salts are attached to a preformed functional polymeric substrate that comprises any functional groups that can form a covalent bond with the $Z^1$, $Z^2$, $Z^3$, $Z^4$, $Z^5$, and $Z^6$ groups of the borate, e.g., through a Click reaction, a substitution reaction, an addition reaction, an oxidative coupling reaction, a radical addition reaction, or any other reaction that can form a bond between the $Z^r$, $Z^2$, $Z^3$, $Z^4$, $Z^5$, and $Z^6$ groups and the functional groups of the polymeric substrate.

In other embodiments, the borate salts are polymerized to form a polymer, e.g., through a Click reaction, a substitution reaction, an addition reaction, an oxidative coupling reaction, a radical addition reaction, or any other reaction that can form a bond between the $Z^1$, $Z^2$, $Z^3$, $Z^4$, $Z^5$, and $Z^6$ groups to form the polymer.

In yet other embodiments, the borate salts are polymerized with a comonomer comprising at least two reactive groups that can copolymerize with the $Z^1$, $Z^2$, $Z^3$, $Z^4$, $Z^5$, and $Z^6$ groups. Preferably the comonomer is a crosslinking monomer with three or more reactive groups that can copolymerize with the $Z^1$, $Z^2$, $Z^3$, $Z^4$, $Z^5$, and $Z^6$ groups. For example, the crosslinking comonomer can contain thiol groups that can undergo an addition to an alkene or alkyne groups on the borate salt to form a sulfur-carbon bonds; or the crosslinker can contain azide groups can undergo an alkyne-azide cycloaddition Click reaction to form 5-membered heteroatom rings with alkyne groups on the borate salt; or the crosslinker containing silane groups can undergo a hydrosilylation reaction with alkene groups on the borate salt to silicon-carbon bonds; or the comonomer can include an unsaturated polymerizable group such a styrene, vinyl halide, methacrylate acid, methyl methacrylate, acrylic acid, ethyl acrylate, or other such unsaturated group, such as an alkene substituted with nitriles, amides, and esters, and the like.

As noted elsewhere herein, the polymer can be formed by direct polymerization of the salt or salts, or by copolymerization with a compatible comonomer. Such polymers can be formed by radical polymerization (e.g., where the salt or salts include an alkenyl or alkynyl group), condensation polymerization e.g., using salts that include a thiol group in combination with a comonomer that can be condensed with of undergoes an addition reaction with a thiol, and oxidative coupling (e.g., of salts that include two or more thiol substituents, optionally with a comonomer having two or more thiol substituents. Non-limiting examples of such comonomers that can undergo condensation polymerization include aliphatic or aromatic monomers that have two or more acyl halide or sulfonyl halide groups, such as succinyldichloride, adipyldichloride, p-phthalyldichloride,1,4-benzene-disulfonylchloride, and the like. The monomer composition can also comprise one or more comonomer comprising at least one alkenyl, alkynyl group, haloalkyl group, or alkylthio group, as well. In the case of alkene and alkyne polymerization, the reaction can be initiated with a radical initiator, such as an organic peroxide. In the case of additions of a thiol to an alkene or alkyne the reaction can be initiated using a radical initiator or ultraviolet light to facilitate the polymerization. In the case of reactions involving displacement of a halogen by a nucleophilic substituent, the reaction can be initiated or promoted using a basic catalyst if needed. Another coupling method involves Ullmann coupling of iodophenyl substituents. For example, 4-iodothiophene can be reacted with an ally group on the borate salt to form a carbon-sulfur bond by ene addition, resulting in an iodophenyl-substituted borate salt. The iodophenyl-substituted borate salt can then be reacted with a di or trifunctional monomer comprising 2 or 3 other iodophenyl substituents using Ullman coupling in the presence of a catalyst such as copper (I) iodide to polymerize the borate and other monomer through biphenyl groups. Alternatively, the iodophenyl-substituted borates salt can be reacted with a multifunctional monomer that includes other groups that can be linked via Ullmann type reactions with copper (I) catalysts, such as amines, phenols and thiols.

In some embodiments, the crosslinking comonomer composition comprises three or more substituents selected from the group consisting of an alkenyl group, an alkynyl group, a thiol group, and a combination thereof. For example, one suitable crosslinking monomer is trimethylolpropane-tris (thiopropionate) (TNITP), also known as 1,1,1-tris-(hydroxymethyl)propane-tris-(3-mercaptopropionate and ttimethylolpropane tris(3-mercaptopropionate).

Each substituted alkyl group of the borate salt comprises at least one substituent such as a substituent selected from the group consisting of a halogen, an amino group, a hydroxyl group, an alkoxy group (e.g., methoxy), a cyano group, a thiol group, a alkylthio group (e.g., $—SCH_3$), a sulfonyl group, a sulfonylamido group, a carboxylic acid group, a carboxylic ester group, a ketone group, a carboxylic amide group, an aryl group, a heteroaryl group, a nonaromatic heterocyclic group, and the like.

In some preferred embodiments of Formulas (I), (II) and (III), at least one of $Z^1$, $Z^2$, $Z^3$, $Z^4$, $Z^5$, and $Z^6$ is fluoro. In some preferred embodiments, at least one of $Z^1$, $Z^2$, $Z^3$, $Z^4$, $Z^5$, and $Z^6$ is an alkenyl group (e.g., allyl), an alkynyl group (e.g., propargyl), a haloalkyl group (e.g., 2-chloroethyl, 2-bromoethyl or 2-iodoethyl), or an alkylenethiol group (e.g., $—CH_2CH_2SH$, also known as 2-mercaptoethyl). In other preferred embodiments at least one of $Z^1$, $Z^2$, $Z^3$, $Z^4$, $Z^5$, and $Z^6$ is $—R^1—O—(R^2—O)_x—R^4$ or $—O—(R^2—O)_x—R^4$ (e.g., a mono(ethylene glycol), an oligo(ethylene glycol) or a poly(ethylene glycol) terminated by an alkenyl group, an alkynyl group, a haloalkyl group, and an alkylenethiol group).

Preferably, the cation, $M^{n+}$, is a cation selected from the group consisting of a hydrogen cation (e.g., H+ or so-called hydronium ion, $H_3O^+$, an alkali metal cation (e.g., Li$^+$, Na$^+$, and an ammonium cation (e.g., $NH_4+$, or $NR_4+$ where each R independently is H, alkyl (e.g., methyl, ethyl, isopropyl, propyl, butyl, t-butyl), or aryl-substituted alkyl (e.g., benzyl). In some preferred embodiments, $M^{n+}$ is Li+.

Borate salts of Formula (I) can be prepared by azeotropically removing water from a mixture of 1 equivalent (eq) of a suitably substituted malonic acid (i.e., a malonic acid of Formula (IV): $C(Z^1)(Z^2)(COOH)_2$ where $Z^1$ and $Z^2$ are as defined for Formulas (I) and (II)), about 0.25 eq of metal carbonate salt (e.g., potassium carbonate), and about 0.5 eq of boric acid in a dry solvent (e.g., diethylcarbonate), e.g., with the aid of a Dean-Stark trap filled with molecular sieves.

Borate salts of Formula (II) can be prepared by reacting I eq of a suitably substituted malonic acid (i.e., a malonic acid of Formula (IV): $C(Z^1)(Z^2)(COOH)_2$ where $Z^1$ and $Z^2$ are as defined for Formulas (I) and (ID), with about 0.25 eq of metal hydroxide salt (e.g., lithium hydroxide), followed by adding about 3 eq boron trifluoride diethyl etherate.

Depending the identities of X, Y, U, V and $Z^3$ to $Z^6$, borate salts of Formula (can be prepared by different strategies, for example:

A. If X=Y=U=V, while $Z^3=Z^4=Z^5=Z^6$, the syntheses can be accomplished through a reaction between $B(OXZ^3)_3$ and $Li(OXZ^3)$; or an exchange reaction between 4 equivalents of $HOXZ^3$ with $LiB(OMe)_4$ under refluxing condition; or a simple reaction between $LiBEL_4$ and $HOXZ^3$ in an inert solvent (dimethoxyethane, pentane etc.); or a reaction between $HOXZ^3$ and $B(OXZ^3)_3$ in presence of $^n$BuLi in THY;

B. If X=Y=U≠V, while $Z^3=Z^4=Z^5≠Z^6$, the syntheses can be accomplished a reaction between $HOVZ^6$ and $B(OXZ^3)_3$ in presence of $^n$BuLi in THF; and C. If X≠Y≠U≠V, while $Z^3≠Z^4≠Z^5≠Z^6$, a simple reaction between $LiBH_4$ and one equivalent of $HOXZ^3$, one equivalent of $HOYZ^4$, one equivalent of $HOUZ^5$, one equivalent of $HOVZ^6$ in an inert solvent (dimethoxyethane, pentane, etc.). Non-limiting examples of suitable polymer substrates for attaching a borate salt include homopolymers, or copolymers comprising two or more different monomer units. Such polymers include, for example a polyimide (e.g., a poly-paraphenylene terephthalamide (branded as KEVLAR), a polycaprolactam (branded as NYLON 6), and the like), a polyacrylate, a polyacrylonitrile, a polysulfone, a polystyrene, a polyphenylene sulfide, a poly(alkylene glycol), and a poly(perfluoroalkylene glycol), wherein the polymeric substrate includes at least one reactive substituent (preferably multiple reactive substituents) attached to the polymer backbone structure either directly or through a linking group. Linking groups can be any divalent moiety situated between the reactive substituent and the polymer backbone. Non-limiting examples of such reactive substituents include an alkenyl group such as —CH=CH$_2$, an alkynyl group such as —C≡CH, a haloalkyl group such as —CH$_2$—X (where X is Cl, Br or I), and thiol group (—SH, also referred to as a mercapto substituent). Non-limiting examples of linking groups for alkenyl, alkynyl, and thiol groups include alkylene (e.g., —CH$_2$—or —CH$_2$CH$_2$—), arylene (e.g., —C$_6$H$_4$—) and combinations thereof. Preferred linking groups for halogens include alkylene groups in which the halogen is on a primary carbon (i.e., a CH$_2$ group).

In another aspect, a ceramic composite comprises particles of one or more solid state lithium ion conducting ceramic material bound together by a polymer as described herein.

In one embodiment, particles of a solid state lithium ion conducting ceramic material are mixed with a monomer mixture comprising the borate salt and the resulting suspension of ceramic particles and monomer composition is polymerized in situ in the presence of the ceramic particles. Preferably, the borate salt comprises alkenyl groups and the monomer mixture comprises a crosslinking monomer, such as TMTP, as described herein, in which case the polymerization can be initiated with ultraviolet light. In other embodiments, the borate salt can be polymerized before combining with the ceramic particles or with a polymer comprising the borate salt, as described herein, to form a ceramic composite in which the salt or polymer acts as a binder for the particles of the ceramic material. These composites can be used, e.g., in solid state electrodes at the electroactive component of the electrode. For example, in some embodiments, the ceramic materials can be oxides, e.g., metal oxides such as $Li_7La_3Zr_2O_{12}$ (a LLZO) and metal phosphates such as $Li_xPO_yN_z$ wherein x=2y+3z-5, $LiTi_2(PO_4)_3$, and the like. In some embodiments, the ceramic particles can be sulfides, including sulfides of main group elements (e.g., Si, P, Ge, Sn), such as, e.g., $Li_3PS_4$, $Li_4GePS_4$, or $Li_{11}P_2GeS_{12}$, $Li_{9.6}P_3S_{12}$, $Li_{10.35}Ge_{1.35}S_{12}$, $Li_{9.81}Sn_{0.81}P_{2.19}S_{12}$, and the like. In some embodiments, the ceramic particles can be mixed oxide-sulfide materials, such as $Li_9P_3S_9O_3$, $Li_{9.42}Si_{1.03}P_{2.1}S_{9.96}O_{2.04}$, and the like. In yet other embodiments, the ceramic particles can be a mixture of two or more different ceramic materials, combinations of oxides, as well as other ceramic materials. The ceramic materials can be doped with different elements (e.g., Ca, NbAl, and the like), if desired. In addition, lattice anions in the ceramics can also be altered by substituting $S^{2-}$ by $O^{2-}$or Cl.

The salt or polymer can be present in the composite in the concentrations ranging from about 10 ppm to about to 99.999 wt % depending on its intended use in the composite (e.g., as a binder, where higher concentrations may be required (e.g., 5 wt %, to 50 wt %), or an additive, where lower concentrations may be used (e.g., 10 ppm to 5 wt %)

The term "alkyl" as used herein denotes saturated hydrocarbon moieties. Preferably, an alkyl group comprises 1 to 20 carbon atoms in the principal chain (e.g., 1 to 12 carbon atoms) and e.g., up to 30 total carbon atoms. These moieties may be straight or branched chain and include methyl, ethyl, propyl, isopropyl, butyl, hexyl, octyl, and similar groups. The term "alkenyl" as used herein denotes a univalent hydrocarbon group containing a double bond. Preferably, alkenyl groups comprise 2 to 20 carbon atoms (e.g., 2 to 12 carbon atoms) in the principal chain, and up to 30 total carbon atoms. The alkenyl groups may be straight or branched chain, or cyclic, and include ethenyl (vinyl), propenyl, isopropenyl, butenyl, isobutenyl, hexenyl, octenyl, oleyl, and the like.

The term "alkynyl" as used herein denotes a univalent hydrocarbon group containing a carbon-carbon triple bond. Preferably, alkynyl groups comprise 2 to 20 carbon atoms (e.g., 2 to 12 carbon atoms) in the principal chain, and up to 30 total carbon atoms. The alkynyl groups may be straight or branched chain, and include ethynyl, propynyl (also referred to as propargyl), butynyl, isobutynyl, hexynyl, octynyl, and the like.

The term "aromatic" as used herein denotes chemical compounds or groups that contain conjugated planar ring systems with delocalized pi electron clouds instead of discrete alternating single and double bonds. The term "aromatic" encompasses the "aryl" and "heteroaryl" groups defined below. The terms "aryl" or "Ar" as used herein alone or as part of another group denote optionally substituted homocyclic aromatic groups, preferably monocyclic or bicyclic groups containing from 6 to 12 carbons in the ring portion, such as phenyl, biphenyl, naphthyl, anthracenyl, substituted phenyl, substituted biphenyl or substituted naphthyl.

The term "heteroaryl" as used herein alone or as part of another group denote optionally substituted aromatic groups having at least one heteroatom in at least one ring, and preferably 5 or 6 atoms in each ring. The heteroaryl group preferably has 1 or 2 oxygen atoms and/or 1 to 4 nitrogen atoms in the ring, and is bonded to the remainder of the molecule through a carbon. Exemplary heteroaryls include furyl, benzofuryl, oxazolyl, isoxazolyl, oxadiazolyl, benzoxazolyl, benzoxadiazolyl, pyrrolyl, pyrazolyl, imidazolyl, triazolyl, tetrazolyl, pyridyl, pyrimidyl, pyrazinyl, pyridazinyl, indolyl, isoindolyl, indolizinyl, benzimidazolyl, indazolyl, benzotriazolyl, tetrazolopyridazinyl, carbazolyl, purinyl, quinolinyl, isoquinolinyl, imidazopyridyl and the like.

The terms "hydrocarbon" and "hydrocarbyl" as used herein describe organic compounds or groups consisting exclusively of the elements carbon and hydrogen. These moieties include alkyl, alkenyl, alkynyl, aryl, carbocyclic moieties, and any combination of two or more thereof. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably comprise 1 to 30 total carbon atoms.

As used herein, the terms carboxylic acid (—C(O)OH), sulfonic acid (—S(O)$_2$OH), and phosphonic acid (—P(O)(OH)$_2$) are meant to encompass both acid forms and salt fouiis thereof (e.g., ammonium ion and metal ion (e.g., alkali metal ion) salts).

Similarly, as used herein, the term "amino" refers to primary, secondary and tertiary amino groups (e.g., —NR$_3$ or NR$_4^+$ where each R independently is H, a hydrocarbyl group, a heteroaryl group, or a non-aromatic heterocyclic group) and compasses basic and salt forms (e.g., halide salts, sulfate salts, phosphate salts, etc.) of the amino groups.

The term "alkoxy" refers to an alkyl group attached through an intervening oxygen atom, e.g., methoxy (—OCH$_3$), ethoxy (—OCH$_2$CH$_3$), and the like. The term "alkylthio" refers to an alkyl group attached through an intervening sulfur atom, e.g., methylthio (—SCH$_3$), ethoxy (—SCH$_2$CH$_3$), and the like.

The term "halogen" refers to F, Cl, Br, and I.

The term "alkyl enethiol" refers to an alkyl groups substituted with an SH (thiol) group.

The term "haloalkyl" refers to an alkyl group substituted with one or more halogen atom.

The term "sulfonyl" refers to an —SO$_2$R' group, where W is a hydrocarbyl group, a heteroaryl group, or a non-aromatic heterocyclic group.

The term "sulfonylamido" refers to an —SO$_2$NR$_2$ group where each R independently is H, a hydrocarbyl group, a heteroaryl group, or a non-aromatic heterocyclic group.

The term "carboxylic amide" refers to a —C(O)OR' group where each R' independently is a hydrocarbyl group, a heteroaryl group, or a non-aromatic heterocyclic group.

A "substituted" group, as described herein (e.g., substituted alkyl, heteroaryl, aryl and heterocyclic moieties) is a group in which one or more hydrogen of the alkyl, heteroaryl, aryl or heterocyclic group is replace by a specified substituent, such as a halogen, an amino group, a hydroxyl group, an alkoxy group, a cyano group, a thiol group, an alkylthio group, a sulfonyl group, a sulfonylamido group, a carboxylic acid group, a carboxylic ester group, a ketone group, a carboxylic amide group, an aryl group, a heteroaryl group, and a nonaromatic heterocyclic group.

A "polymer backbone" as used herein refers to a characteristic polymer structure onto which reactive functional groups can be attached (e.g., by replacement of a hydrogen atom). The reactive functions groups are groups that can be selectively reacted with an alkenyl group, an alkynyl group, an SH group, or a halogen group of the borate salt to form, e.g., a carbon-carbon bond, a carbon sulfur bond, or a sulfur-sulfur bond between the salt and the polymer backbone.

Some non-limiting examples of polymer backbones include a polyamide, a polyacrylate, a polyacrylonitrile, a polysulfone, a polystyrene, a polyphenylene sulfide, a poly (alkylene glycol), and a poly(perfluoroalkylene glycol). Some non-limiting representative polymer backbone structures include:

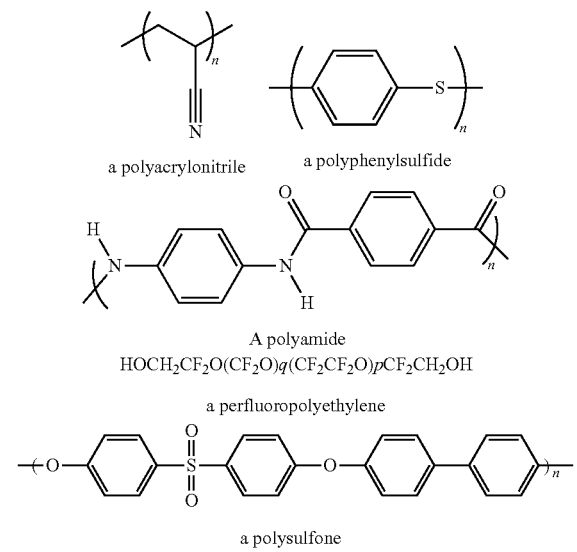

and which are substituted with a reactive group for attachment of the borate salt.

"Click reaction" is a term describing reactions that are highly efficient reactions that which create no byproducts or only byproducts that can be removed without chromatography, and can be conducted in easily removable inert solvents. Non-limiting examples of Click reactions include, e.g., copper catalyzed azide-alkyne 3+2 cycloaddition reactions, Staudinger ligations between azides and phosphines, Diels-alder reactions between dienes and alkenes or alkynes, and the like.

The following non-limiting examples illustrate rious features of the materials and methods described herein.

EXAMPLE 1

Synthesis of diethyl 2-allyl-2-fluoromalonate

A solution of sodium ethoxide (126 g, 20% in ethanol, EtOH) was charged to a 500 mL 3-neck round bottom flask, followed by ethanol (150 mL). Diethyl 2-fluoromalonate (60 g) was added over 5 minutes, with a 1-2° C. increase in temperature. The mixture was stirred for 1 hour at room temperature, forming a precipitate. Allyl bromide (32 mL) was added via syringe pump over 1 hour, using a room temperature water bath to moderate the exotherm. After the addition was compete, the reaction was heated to 55° C. for 1 hour, then cooled overnight. The ethanol was evaporated, and the residue was partitioned between methyl-t-butyl ether (MTBE) and water. The MTBE phase was collected and the MTBE was removed. The resulting residue was distilled at 77 V, 5 Torr pressure, to provide 65 g of diethyl 2-allyl-2-fluoromalonate product as a clear, colorless liquid.

EXAMPLE 2

Synthesis of 2-allyl-2-Fluoro Malonic Acid, Disodium Salt

A solution of sodium hydroxide (26.78 g, 0.61 mol, 2.22 equiv) in water (150 mL) was prepared, stirring until all solids were gone. Ethanol (450 mL) was added, followed by diethyl 2-allyl-2-fluoromalonate (64.6 g). The resulting mixture was stirred for 1 hour at 60° C., then cooled to less than 15° C., and filtered. The filter cake was washed with ethanol (2×150 mL) and MTBE (2×100 mL), and then dried in a vacuum oven to yield 60.61 g of 2-allyl-2-fluoro malonic acid, disodium salt.

EXAMPLE 3

Synthesis of 2-allyl-2-fluoro Malonic Acid

2-Allyl-2-fluoro malonic acid, di sodium salt (60 g) was slurried in water (60 mL) containing just enough 12 M HCl to make a thick paste. Additional HCl was then added dropwise until a clear colorless solution (pH=1) was obtained (the total amount of 12 M HCl added was 52 mL, 2.22 equiv). The solution was stirred for 1 hour, and then was saturated NaCl by adding solid NaCl. The aqueous solution was extracted with MTBE (3×100 ml), dried with sodium sulfate, and evaporated by rotatory evaporation. The residual solids were washed with dichloromethane and dried to afford 41.48 g of 2-allyl-2-fluoro malonic acid.

EXAMPLE 4

Synthesis of potassium bis(2-allyl-2-fluoroinalonato)borate

A 500 int 2-necked round bottom flask equipped with a thermocouple probe was charged with a thoroughly ground mixture of 2-allyl-2-fluoro malonic acid (10.0 g, 61.68 mmol, 1.00 equivalent), potassium carbonate (2.14 g, 15.5 mmol, 0.25 eq), and boric acid (1.92 g, 30.9 mmol, 0.50 eq). The solids were suspended in diethyl carbonate (DEC, 250 mL) with stirring. A Dean-Stark trap filled with dry 3 Å molecular sieves (8-12 mesh) was attached to the reaction flask and the mixture heated at reflux under reduced pressure for 6 hours, The reaction mixture was then cooled under nitrogen and stirred overnight. The mixture was filtered, washed with 20 mL of fresh DEC and then again with 20 mL dry MTBE before drying in a vacuum oven at 60° C. to provide 9.01 g of potassium bis(2-allyl-2-fluoromalonato) borate (K-BAFMB) as a white powder: FUR was similar to the Li analogue. $^1$H NMR (80 MHz) 6.1-5.6 (m, 1H), 5.4-5.0 (m, 2H), 2.90 (dd, JHF=25 Hz, JHH=6.4 Hz, 2H). 19F NMR (75 MHz 164.61 (t.=25 Hz).

EXAMPLE 5

Polymerization of a Bis(malonato)borate Salt with a Crosslinking Monomer

FIG. 1 schematically illustrates polymerization of a bis(malonato)borate salt of Formula (I) where $Z^r$ is F, $Z^2$ is allyl, and $M^{n+}$ is Li+, with a crosslinking monomer (TMPT) initiated by UV light. In detail, 0.5 ml of a solvent mixture of propylene carbonate, (PC) and ethylene carbonate (EC) with a volume ratio of 7:3 was added to a mixture of 0.5 mmol lithium bis(fluoroallyl)malonate borate (LiFBMB), 0.33 mmol trimethylolpropane tris(3-mercaptopropionate) (TMPT), and 0.05 mmol 4-dimethylaminopyridine (DMAP) in an Ar-filled glovebox and kept stirring for about 30 minutes to achieve a clear solution. The solution was then poured into a TEFLON polymer mold. After exposure under UV light for 15 minutes, a free-standing single-ion conducting polymer was obtained, sometimes referred to herein as SIE.

EXAMPLE 6

Polymerization of a Bis(malonato)borate Salt with a Crosslinking Monomer in Situ with LLZO Particles About 0.5 ML of a solvent mixture of propylene carbonate, (PC) and ethylene carbonate (EC) with a volume ratio of 7:3 was added to a mixture of 0.5 mmol lithium bis (fluoroallyl) malonate borate (LIFBMB), 0.33 mmol trimethylolpropane tris(3-mercaptopropionate) (TMPT) and 0.05 mmol 4-dimethylaminopyridine (DMAP) in an Ar-tilled and kept stirring for 30 min to achieve a clean solution. The solution was transferred into a vial with a ceramic electrolyte powder of formula: $Li_7La_3Zr_2O_{12}$ (LLZO) with a weight ratio of 35/65. Then, the vial was sealed and moved outside the glovebox for ultra-sonication for 30 min, obtaining a milk-like suspension. The suspension was then transferred back to the glovebox and drop-casted into a TEFLON polymer mold. After exposure under UV light for 15 min, a free-standing single-ion conducting polymer bond ceramic electrolyte was achieved.

EXAMPLE 7

Electrochemical Evaluation of SIE-LLZO

The ionic conductivity of the SIE was measured via impedance spectroscopy in a symmetric set-up of SS/SIE/SS in an automated temperature control oven. The electrochemical stability of the single ion conducting polymer electrolyte was characterized by cyclic voltammetry at a scan rate of 0.2 mV/s in a voltage range of –0.5 V to 5 V for three cycles. The Li ion transference No. of the polymer electrolyte was measured via a potentiostatic polarization method with 10 inV, in which the current and internal resistance at initial and steady state were recorded when a small constant potential was employed.

Lithium plating/stripping measurements were performed in the symmetric Li-SIE/SIE-Li cells at constant current densities. The LLZO-polymer composite electrolyte was further evaluated in the cell with NCA as cathode and Li metal as anode operated at 4.1 V.

Figure 2:
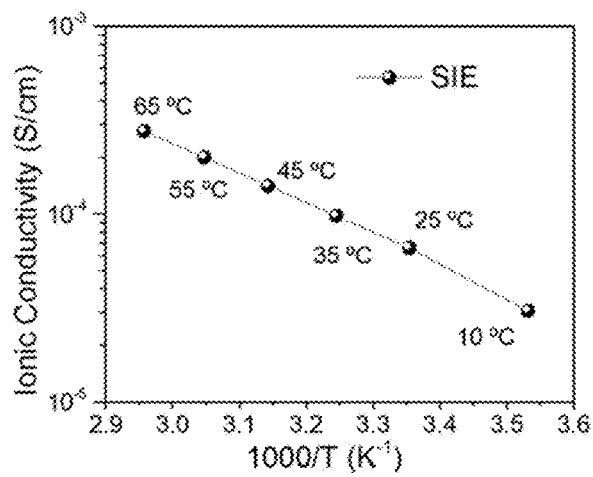
FIG. 2 shows a graph of ionic conductivity versus 1.000/T (in units of $K^{-1}$) for a single ion conducting borate polymer as described herein.
Figure 3:
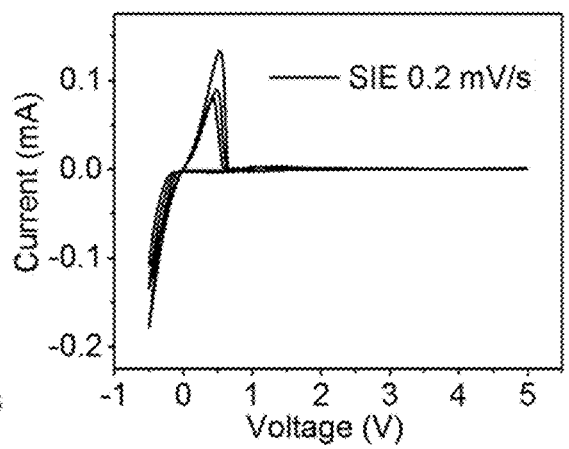
FIG. 3 shows a graph of current versus voltage for a single ion conducting polymer electrolyte as described herein.

The ionic conductivity of the SIE was measured via impedance spectroscopy in a symmetric set-up of SS/SIE/SS (FIG. 2). At 10° C., 25° C., 35° C., 45° C. and 55° C., the SIE polymer electrolyte showed an ionic conductivity of $3.1 \times 10^{-5}$ S/cm, $6.6 \times 10^{-5}$ S/cm, $9.8 \times 10^{-4}$ S/cm, $1.4 \times 10^{-4}$ S/cm, $2.0 \times 10^{-4}$ S/cm, $2.8 \times 10^4$ S/cm, respectively In FIG. 3, the electrochemical stability of the single ion conducting polymer electrolyte was characterized by cyclic voltammetry at a scan rate of 0.2 mV/s in a voltage range of –0.5 V to 5 V for three cycles. The anodic peak at –0.5 V and cathodic peak at 0.5 V are associated with the Li plating and stripping. No obvious oxidation peaks were observed until 5V, illustrating the electrochemical stability of SIE.

Figure 4:
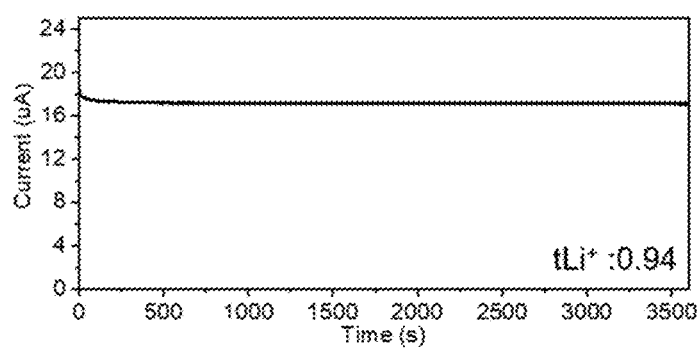
FIG. 4 provides a graph of data from potentiostatic polarization tests of a single ion conducting polymer electrolyte as described herein.
Figure 5:
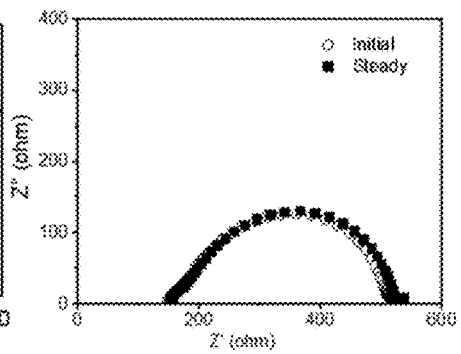
FIG. 5 provides a graph of data from potentiostatic polarization tests of a single ion conducting polymer electrolyte as described herein.

The Li ion transference number of the polymer electrolyte was measured via a potentiostatic polarization method, in which the current and internal resistance at initial and steady state were recorded when a small constant potential was employed (FIG. 4 and FIG. 5). According to the Bruce and Vincent's equation, the Li Transference No. of SIE was calculated to be 0.94, which is considerably higher than the conventional PEO-based polymer electrolyte with a Li ion Transference No, around 0.3.

Figure 6:
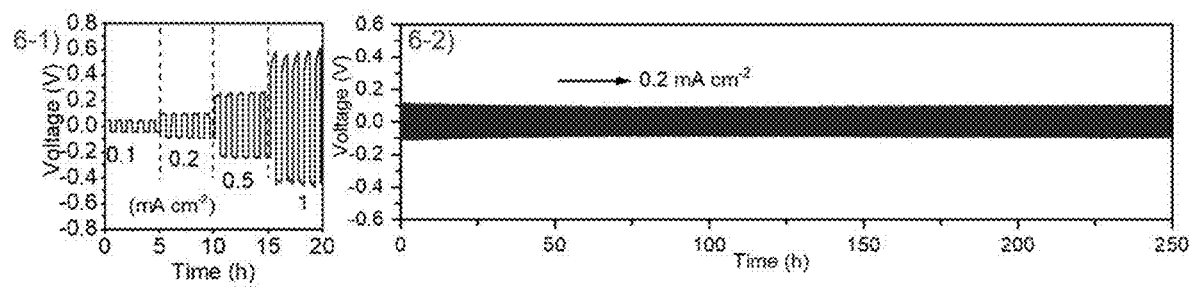
FIG. 6 provides a graph of results from a stripping and plating test of a LEZO-polymer composite electrolyte as described herein.

Lithium plating/stripping measurements were performed to evaluate the compatibility of LLZO-polymer composite electrolyte with Li metal. Symmetric Li-SIE/SIE-Li cells were used to plate and strip lithium at constant current densities from 0.1 mA/cm$^2$ to 1 mA/cm$^2$ with 0.5 hours for each stripping/plating (FIG. 6). As is shown in FIG. 6, the overpotential increased from 0.05 V to 0.1 V, 0.24 V and 0.56 V along with an increase in current densities from 0.1 mA/cm$^2$ to 0.2 mA/cm$^2$, 0.5 mA/cm$^2$, and 1 mA/cm$^2$. When the current was returned to 0.2 V, the overpotential returned to 0.1 V and lasted for 250 cycles.

Figure 7:
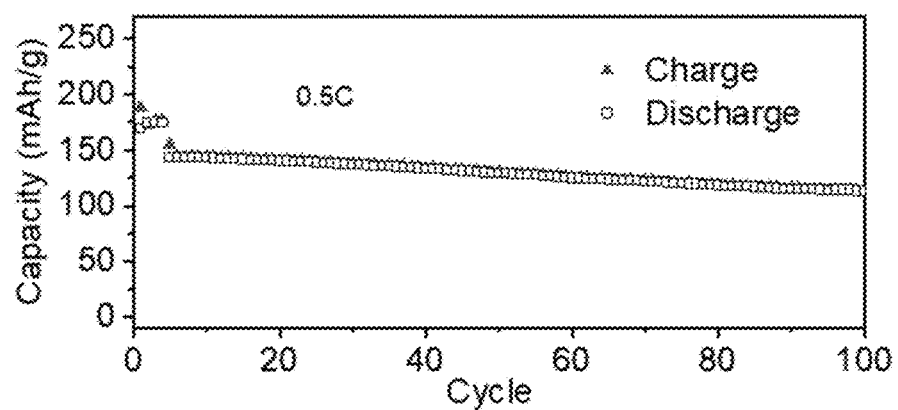
FIG. 7 provides a graph of capacity versus cycle number for a cell comprising a lithium anode, a polymer-LLZO composite electrolyte as described herein, and a nickel-cobalt-aluminum (NCA) cathode, operated at 4.1 V.

The LLZO-polymer composite electrolyte was further evaluated in the cell with NCA as cathode and Li metal as anode operated at 4.1 V (FIG. 7). The SIE-LFP electrode was compressed onto SIE-Li metal electrode and fabricated into the coin cell without using separators or adding any liquid materials for wetting. The cell delivered a reversible capacity of 144 mAh/g at 0.5 C cycling rate with a capacity retention of 78% for 100 cycles.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Embodiments of the invention in which an exclusive property or privilege is claimed are defined as follows:

1. A single-ion conducting polymer-ceramic composite comprising particles of a lithium ion conducting ceramic in matrix of a single-ion conducting polymer; wherein the single-ion conducting polymer is formed by polymerization of a bis(2-allyl-2-fluoromalonato)borate salt in the presence of a cross-linking co-monomer comprising trimethylolpropane tris(3-mercaptopropionate) initiated by exposing the precursor mixture to ultraviolet light.

2. The single-ion conducting polymer-ceramic composite of claim 1, wherein the polymerization is conducted in the presence of 4-dimethylaminopyridine.

3. The single-ion conducting polymer-ceramic composite of claim 1, wherein the polymerization is conducted in the presence of the particles of the lithium ion conducting ceramic.

4. The single-ion conducting polymer-ceramic composite of claim 1, wherein the lithium ion conducting ceramic comprises at least one material selected from the group consisting of a metal oxide, a metal phosphate, a metal sulfide, and a metal oxide-sulfide.

5. The single-ion conducting polymer-ceramic composite of claim 1, wherein the lithium ion conducting ceramic comprises a lithium-lanthanum-zirconium oxide material.

6. The single-ion conducting polymer-ceramic composite of claim 5, wherein the lithium-lanthanum-zirconium oxide material is $Li_7La_3Zr_2O_{12}$.

7. The single-ion conducting polymer-ceramic composite of claim 1, wherein the lithium ion conducting ceramic comprises $LiTi_2(PO_4)_3$.

8. The single-ion conducting polymer-ceramic composite of claim 1, wherein the lithium ion conducting ceramic comprises at least one metal sulfide selected from the group consisting of $Li_3PS_4$, $Li_4GePS_4$, $Li_{11}P_2GeS_{12}$, $Li_{9.6}P_3S_{12}$, $Li_{10}GeP_2S_{12}$, $Li_{10.35}Ge_{1.35}P_{1.65}S_{12}$, and $Li_{9.81}Sn_{0.81}P_{2.19}S_{12}$.

9. The single-ion conducting polymer-ceramic composite of claim 1, wherein the lithium ion conducting ceramic comprises at least one metal oxide-sulfide selected from the group consisting of $Li_9P_3S_{903}$ and $Li_{9.42}Si_{1.03}P_{2.1}S_{9.96}O_{2.04}$.

10. The single-ion conducting polymer-ceramic composite of claim 1, wherein the bis(2-allyl-2-fluoromalonato)borate salt is lithium bis(2-allyl-2-fluoromalonato)borate.

11. A single-ion conducting polymer-ceramic composite comprising particles of a lithium ion conducting ceramic in matrix of a single-ion conducting polymer; wherein the single-ion conducting polymer is formed by ultraviolet light initiated polymerization of lithium bis(2-allyl-2-fluoromalonato)borate in the presence of trimethylolpropane tris(3-mercaptopropionate) and 4-dimethylaminopyridine.

12. The single-ion conducting polymer-ceramic composite of claim 11, wherein the polymerization is conducted in the presence of the particles of the lithium ion conducting ceramic.

13. The single-ion conducting polymer-ceramic composite of claim 11, wherein the lithium ion conducting ceramic comprises at least one material selected from the group consisting of a metal oxide, a metal phosphate, a metal sulfide, and a metal oxide-sulfide.

14. The single-ion conducting polymer-ceramic composite of claim 11, wherein the lithium ion conducting ceramic comprises a lithium-lanthanum-zirconium oxide material.

15. The single-ion conducting polymer-ceramic composite of claim 14, wherein the lithium-lanthanum-zirconium oxide material is $Li_7La_3Zr_2O_{12}$.

16. The single-ion conducting polymer-ceramic composite of claim 11, wherein the lithium ion conducting ceramic comprises $LiTi_2(PO_4)_3$.

17. The single-ion conducting polymer-ceramic composite of claim 11, wherein the lithium ion conducting ceramic comprises at least one metal sulfide selected from the group consisting of $Li_3PS_4$, $Li_4GePS_4$, $Li_{11}P_2GeS_{12}$, $Li_{9.6}P_3Su$, $Li_{10}GeP_2S_{12}$, $Li_{10.35}Ge_{1.35}P_{1.65}S_{12}$, and $Li_{9.81}Sn_{0.81}P_{2.19}S_{12}$.

18. The single-ion conducting polymer-ceramic composite of claim 11, wherein the lithium ion conducting ceramic comprises at least one metal oxide-sulfide selected from the group consisting of $Li_9P_3S_9O_3$ and $Li_{9.42}Si_{1.03}P_{2.1}S_{9.96}O_{2.04}$.

* * * * *

UNITED STATES PATENT AND TRADEMARK OFFICE
CERTIFICATE OF CORRECTION

PATENT NO. : 11,649,358 B2
APPLICATION NO. : 16/567647
DATED : May 16, 2023
INVENTOR(S) : Chen Liao, Trevor L. Dzwiniel and Kewel Liu It is certified that error appears in the above-identified patent and that said Letters Patent is hereby corrected as shown below:

In the Claims

Claim 9, Column 18, Line 33, delete "$Li_9P_3S_{9O3}$" and insert --$Li_9P_3S_9O_3$--.

Claim 17, Column 18, Line 65, delete "$Li_{9.6}P_3Su$" and insert --$Li_{9.6}P_3S_{12}$--.

Claim 18, Column 19, Line 4, delete "$S_{9.96O2.04}$" and insert --$S_{9.96}O_{2.04}$--.

Signed and Sealed this
First Day of August, 2023

Katherine Kelly Vidal
*Director of the United States Patent and Trademark Office*